July 8, 1958  R. L. FULLMAN ET AL  2,842,469
METHOD OF PRODUCING SINGLE CRYSTALS OF IRON
Filed Aug. 26, 1957

Inventors:
Robert L. Fullman,
Arno Gatti,
by Paul A. Frank
Their Attorney.

United States Patent Office 2,842,469
Patented July 8, 1958

2,842,469

METHOD OF PRODUCING SINGLE CRYSTALS OF IRON

Robert L. Fullman and Arno Gatti, Schenectady, N. Y., assignors to General Electric Company, a corporation of New York Application August 26, 1957, Serial No. 680,612

16 Claims. (Cl. 148—1.6)

This invention relates to a method of preparing high strength single crystals and more particularly to a process by which high strength rod-like crystals of iron may be prepared.

This application is a continuation-in-part of our copending application, Serial No. 471,077, filed November 24, 1954, now abandoned, and assigned to the same assignee as the present invention.

The values of the mechanical properties such as tensile strength, elastic limit, etc. of known materials are very much lower than the theoretical values of such properties. This discrepancy between theoretical and actual values has been attributed in the past to several causes. It has been concluded that the relatively low mechanical properties of known structural materials is for the greater part caused by inherent defects such as dislocations, etc. in the crystal structure of these materials. This invention is concerned with the elimination of all or nearly all of such structural defects in iron crystals to produce a rod-like crystal having mechanical properties equal to or which closely approach the theoretical values.

A principal object of our invention is the provision of a method for producing nearly perfect single crystals of iron having values of mechanical properties far in excess of those of single crystals produced by known methods.

Other and specifically different objects of our invention will become apparent from the following detailed disclosure and claims.

As stated previously, the strength or mechanical properties of known materials are considerably lower than their theoretical properties. For example, the elastic limit for single crystals of iron should be about 300,000 p. s. i. (pounds per square inch) for an induced elastic strain of 1.5%. However, inasmuch as only about 0.03% elastic strain may be induced in conventionally produced iron single crystals, their elastic limit is of the order of about 6,000 p. s. i.

Briefly stated, in accordance with one aspect of our invention, we have discovered a process whereby iron crystals having near-theoretical strength may be made by heat treating a source of iron, such as a compound of iron which is reducible in dry hydrogen, in an atmosphere of dry hydrogen in the presence of an ammonium halide, such as ammonium chloride, at a temperature between 600° to 800° C. for a time sufficient to reduce substantially all of the reducible iron compound present.

Figure 1:
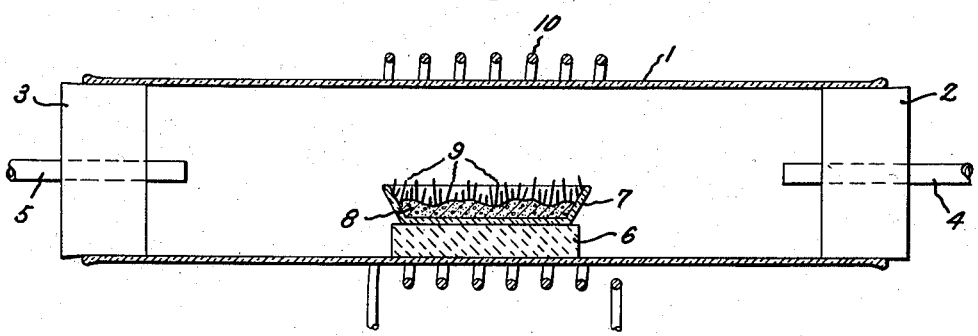
Figure 2:
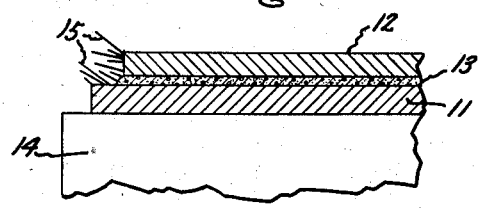

In the detailed disclosure to follow, reference will be made to the accompanying drawing in which Fig. 1 is a schematic representation of apparatus which may be used to practice our invention in which parts are broken away for clarity, and Fig. 2 is a fragmentary representation in section with parts broken away of another embodiment of our invention.

We have discovered a process whereby iron crystals having near-theoretical strength may be made. More specifically, a mixed ferric and aluminum hydroxide filtrate, prepared by coprecipitation from a solution of ferric and aluminum chlorides with ammonium hydroxide, is dried without washing as a cake. The dried filter cake is frangible and may be broken up if desired and placed in a suitable open top vessel or container such as a porcelain crucible or boat, for example.

The container with the dried hydroxides may then be treated in apparatus such as shown in Fig. 1 in which a horizontally arranged tubular member 1 is provided with end closures 2 and 3 having tubular parts 4 and 5 therethrough, respectively. A support 6 of a refractory material such as firebrick may be provided within tube 1 if desired to provide a support for open top container 7 as previously described. Container 7 is shown in Fig. 1 partially filled with a spongy mass 8 of reduced filter cake and rod-like crystals of iron 9 as will be described in greater detail later. Additionally, heating means such as electrical resistance coils 10 are provided to furnish heat to the tubular member 1 and the container 7 therewithin. Means are provided to continuously introduce dry hydrogen into tubular member 1 through port 4 and to permit it to exit through port 5.

With the apparatus assembled with the container 7 partially filled with the previously described dry filter cake and supported therein as shown in Fig. 1, the air contained within the tubular member 1 is swept out with dry hydrogen. As will be apparent from inspection, the apparatus in Fig. 1 constitutes a conventional controlled atmosphere tube furnace and as such constitutes no part of our invention, being merely shown and described as an example of apparatus which may be employed in practicing the process of our invention. The mixed dry hydroxides are then subjected to a reducing treatment by heating in the atmosphere of dry hydrogen at a temperature of from about 600° C. to 800° C. preferably about 650° C. to about 750° C. by means of heater 10 for the time necessary to reduce substantially all the iron hydroxide. A spongy mass of aluminum oxide and iron 8 and elongated rod-like iron crystals 9 are thus produced. The rod-like crystals of iron 9 may be readily detached by merely lifting them from their growth sites. The rod-like iron crystals 9 are single crystals and withstand induced elastic strains of up to about 1.5%. Crystals of the order of about 0.001 inch square and about 1.0 inch long may be produced by this process. In view of their high strength, these crystals may be used as strain gauge elements, small springs and for many other useful purposes which will readily occur to one skilled in the art.

Similar crystals may be produced by the same process except for the omission of aluminum in apparatus functionally similar to that shown in Fig. 1. In this embodiment, ferric hydroxide alone is precipitated from a solution of ferric chloride by the addition of ammonium hydroxide. The ferric hydroxide filter cake is dried without washing and heated in a dry hydrogen atmosphere at a temperature between about 600° C. and 800° C. for a period of time sufficient to reduce the hydroxide.

Similar crystals may be produced by heating a mixture of finely divided iron and ammonium chloride. Finely divided iron powder (about 100 mesh, for example) is mixed with moist ammonium chloride. The mixture is then heated in an atmosphere of dry hydrogen in the range of about 600° C. to 800° C., preferably from about 650° C. to about 750° C. to produce high strength iron crystals.

Similar iron crystals may be produced by spreading a layer of ammonium chloride on a sheet of iron, placing another sheet of iron on the ammonium chloride layer and heating in an atmosphere of dry hydrogen in the range of about 600° C. to 800° C., preferably from about 650° C. to 750° C. to produce high strength iron crystals.

This is illustrated in Fig. 2 in which a sheet of iron 11 supports and is separated from a similar sheet of iron 12 by a layer of ammonium chloride 13. The sheets of iron may be conveniently supported by a refractory member 14 which is the functional equivalent of support 6 shown in Fig. 1. Support 14 and the iron sheets may then be placed into a furnace such as shown in Fig. 1 and treated in the manner previously described. Rod-like, near-perfect high strength iron crystals 15 are thereby grown as shown in Fig. 2. The crystals may be readily detached from the growth sides on the iron sheets.

It has been determined that no crystals will be formed if the temperature range of about 600° C. to 800° C., preferably between 650° C. to 750° C., is either not reached or is exceeded during the heat treatment. Further, if the filter cake of the first two processes is washed free of ammonium chloride, no crystals will be formed. Still further, if a different base such as sodium hydroxide is completely substituted for the ammonium hydroxide in the first two processes, no crystals will be formed.

Similar high strength iron crystals may be produced by heating a mixture of finely divided iron oxide, for example $Fe_2O_3$, and ammonium halide. More specifically, finely divided $Fe_2O_3$ was mixed with about 10 to 15 percent by weight ammonium bromide and the mixture heated in a boat in an atmosphere of dry hydrogen at about 730° C. for about one hour. During this treatment, the iron oxide was reduced and formed the high strength iron crystals.

In a substantially identical manner, high strength iron crystals were produced by heat treating a finely divided mixture of iron oxide and ammonium iodide in dry hydrogen at about 730° C.

The necessary conditions for producing high strength iron crystals according to our invention, therefore, is the presence of an ammonium halide, a source of iron, a reducing atmosphere of dry hydrogen and a heating treatment between about 600° C. to 800° C., preferably between 650° C. to 750° C.

From the foregoing, it is apparent that we have provided a novel, useful process for producing near-perfect high-strength crystals of iron. In the foregoing description of our invention, the several specific embodiments thereof have been cited as exemplary and we intend in the appended claims to cover all changes and modifications which do not constitute departures from the spirit and scope of the invention.

What we claim as new and desire to secure by Letters Patent of the United States is:

1. A method for producing rod-like high strength single crystals of iron comprising heating a source of iron in a dry hydrogen atmosphere in the presence of an ammonium halide in the temperature range of from about 600° C. to about 800° C.

2. The method recited in claim 1 in which the temperature range is from about 650° C. to 750° C.

3. The method recited in claim 1 in which the ammonium halide is ammonium chloride.

4. The method recited in claim 1 in which the ammonium halide is ammonium bromide.

5. The method recited in claim 1 in which the ammonium halide is ammonium iodide.

6. A method for producing rod-like high strength single crystals of iron comprising the steps of precipitating ferric hydroxide from a solution of an iron salt in the presence of an ammonium halide, separating the precipitate from the supernatant fluid, drying the precipitate in cake form, and heating the precipitate in a dry hydrogen atmosphere at a temperature of from about 600° C. to 800° C. for a time necessary to reduce substantially all the iron oxide.

7. The method recited in claim 6 in which the ammonium halide is ammonium chloride.

8. The method recited in claim 6 in which the ammonium halide is ammonium bromide.

9. The method recited in claim 6 in which the ammonium halide is ammonium iodide.

10. A method for producing rod-like high strength single crystals of iron comprising the steps of mixing finely divided iron powder with a moist ammonium halide, providing the mixture with a dry hydrogen atmosphere and heating at a temperature between about 600° C. and 800° C.

11. The method recited in claim 10 in which the ammonium halide is ammonium chloride.

12. A method for producing rod-like high strength single crystals of iron comprising the steps of applying a layer of an ammonium halide to the surface of an iron plate, providing the coated plate with a hydrogen atmosphere and heating the plate at a temperature between about 600° C. to 800° C.

13. The method recited in claim 12 in which the ammonium halide is ammonium chloride.

14. A method for producing rod-like high strength single crystals of iron comprising the steps of mixing finely divided iron oxide with a finely divided ammonium halide, providing the mixture with a dry hydrogen atmosphere and heating at a temperature between about 600° C. and 800° C.

15. The method recited in claim 14 in which the ammonium halide is ammonium bromide.

16. The method recited in claim 14 in which the ammonium halide is ammonium iodide.

No references cited.